(12) United States Patent
Kobayashi et al.

(10) Patent No.: US 8,730,389 B2
(45) Date of Patent: May 20, 2014

(54) VIDEO PROCESSING APPARATUS

(75) Inventors: Takaaki Kobayashi, Osaka (JP); Hiroki Okada, Osaka (JP); Yuji Yamamoto, Osaka (JP)

(73) Assignee: Onkyo Corporation, Neyagawa-shi (JP)

( * ) Notice: Subject to any disclaimer, the term of this patent is extended or adjusted under 35 U.S.C. 154(b) by 209 days.

(21) Appl. No.: 13/287,191

(22) Filed: Nov. 2, 2011

(65) Prior Publication Data

US 2012/0182474 A1 Jul. 19, 2012

(30) Foreign Application Priority Data

Jan. 18, 2011 (JP) .................................... 2011-7997

(51) Int. Cl.
*H04N 7/01* (2006.01)
*H04N 5/10* (2006.01)
*H04N 7/00* (2011.01)
*H04N 11/00* (2006.01)

(52) U.S. Cl.
USPC ............ 348/441; 348/458; 348/529; 348/552

(58) Field of Classification Search
USPC .......................................... 348/529, 441, 552
See application file for complete search history.

(56) References Cited

U.S. PATENT DOCUMENTS

| | | | | |
|---|---|---|---|---|
| 6,262,762 B1 * | 7/2001 | Gunzel et al. | .................... | 348/97 |
| 6,404,459 B1 * | 6/2002 | Kitou et al. | .................... | 348/555 |
| 6,469,744 B1 | 10/2002 | Pearlstein | | |
| 6,690,425 B1 * | 2/2004 | Worrell | .......................... | 348/445 |
| 6,714,253 B2 * | 3/2004 | Kim et al. | ...................... | 348/556 |
| 6,738,559 B1 * | 5/2004 | Yoo et al. | ....................... | 386/231 |
| 7,079,128 B2 | 7/2006 | Kim | | |
| 7,206,025 B2 * | 4/2007 | Choi | ............................. | 348/441 |
| 7,224,404 B2 * | 5/2007 | An et al. | ........................ | 348/584 |
| 7,683,920 B2 | 3/2010 | Kitayama et al. | | |
| 7,697,064 B2 * | 4/2010 | Komatsu | ....................... | 348/453 |
| 7,761,709 B2 * | 7/2010 | Choi | ............................. | 713/168 |
| 7,825,931 B2 * | 11/2010 | Mawatari et al. | ............. | 345/501 |
| 8,319,757 B2 * | 11/2012 | Choi | ............................. | 345/204 |
| 2002/0001347 A1 * | 1/2002 | Rhee | ......................... | 375/240.16 |
| 2002/0015104 A1 | 2/2002 | Itoh et al. | | |
| 2002/0041335 A1 * | 4/2002 | Taraci et al. | ................... | 348/511 |
| 2002/0089523 A1 * | 7/2002 | Hodgkinson | .................. | 345/660 |
| 2002/0135605 A1 * | 9/2002 | Kim | ............................... | 345/698 |
| 2004/0046772 A1 * | 3/2004 | Ouchi et al. | ................... | 345/690 |
| 2004/0090556 A1 * | 5/2004 | Kamieniecki et al. | ......... | 348/558 |
| 2005/0027933 A1 * | 2/2005 | Iyengar | .......................... | 711/112 |

(Continued)

FOREIGN PATENT DOCUMENTS

EP 2139234 12/2009
EP 2 293 272 A1 3/2011

(Continued)

*Primary Examiner* — Brian Yenke
(74) *Attorney, Agent, or Firm* — Renner, Otto, Boisselle & Sklar, LLP

(57) ABSTRACT

An AV amplifier detects combinations of resolutions and vertical frequencies of input video data, and reads information about combinations of resolutions and vertical frequencies stored in a display device in advance. The AV amplifier sets values, that are a combination of an output resolution and an output vertical frequency in which a value obtained by dividing a vertical frequency of the video data detected by a video detecting section by the output vertical frequency is an integer number and are present in the combinations of the resolutions and the vertical frequencies read by the reading section, as the combination of the output resolution and the output vertical frequency.

3 Claims, 6 Drawing Sheets

(56) References Cited

U.S. PATENT DOCUMENTS

| | | |
|---|---|---|
| 2005/0046747 A1* | 3/2005 | Park et al. ............... 348/569 |
| 2005/0078193 A1* | 4/2005 | Ing et al. ............... 348/222.1 |
| 2005/0219147 A1* | 10/2005 | Sato ............... 345/1.1 |
| 2005/0285883 A1* | 12/2005 | Chen ............... 345/698 |
| 2006/0015813 A1* | 1/2006 | Chung et al. ............... 715/542 |
| 2006/0092187 A1* | 5/2006 | Wang ............... 345/698 |
| 2007/0070402 A1* | 3/2007 | Kitayama et al. ............... 358/1.15 |
| 2007/0098355 A1* | 5/2007 | Kim ............... 386/46 |
| 2007/0171305 A1* | 7/2007 | Kim ............... 348/563 |
| 2007/0230569 A1 | 10/2007 | Itoh et al. |
| 2007/0291841 A1* | 12/2007 | Muraki et al. ............... 375/240.12 |
| 2008/0055318 A1 | 3/2008 | Glen |
| 2008/0055464 A1* | 3/2008 | Shin ............... 348/441 |
| 2008/0106657 A1* | 5/2008 | Kitayama et al. ............... 349/37 |
| 2008/0192060 A1* | 8/2008 | Ogiso ............... 345/546 |
| 2008/0309821 A1* | 12/2008 | Kim ............... 348/563 |
| 2009/0262263 A1 | 10/2009 | Miller |
| 2009/0316047 A1 | 12/2009 | Sawada et al. |
| 2010/0020196 A1* | 1/2010 | Suzuki et al. ............... 348/231.7 |
| 2011/0304522 A1* | 12/2011 | Zeng et al. ............... 345/1.1 |

FOREIGN PATENT DOCUMENTS

| | | |
|---|---|---|
| JP | 2002-333873 | 11/2002 |
| JP | 2007-079176 | 3/2007 |
| JP | 2010-004467 | 1/2010 |
| WO | 2005/050978 A1 | 6/2005 |
| WO | WO 2007/027265 A1 | 3/2007 |

* cited by examiner

VIDEO PROCESSING APPARATUS

BACKGROUND OF THE INVENTION

1. Field of the Invention

The present invention relates to a video processing apparatus for converting video data into set output resolution and output vertical frequency and outputting them.

2. Description of the Prior Art

Systems where BD players, AV amplifiers and display devices are connected via HDMI cables are adopted. Video data reproduced by the BD players are output to the display devices via the AV amplifiers.

Display devices can display images with a plurality of resolutions and vertical frequencies. Displayable types of resolutions and vertical frequencies are stored as EDID in built-in PROMs in advance. The AV amplifiers read EDID from the connected display devices, and read information about combinations of the resolutions and vertical frequencies displayable by the display devices from the EDID. The AV amplifiers select one from the combinations of the resolutions and the vertical frequencies displayable by the display devices via a user's operation, for example, and set the selected combination as the output resolution and the output vertical frequency. The AV amplifiers convert video data received from the BD players into the set output resolution and output vertical frequency, and output them to the display devices.

Recently, high resolution that is so-called as 4K2K turns up as high resolution that is about four times as high as full-HD. As the 4K2K, 3840×2160 30 Hz, 3840×2160 25 Hz, 3840×2160 24 Hz, and 4096×2160 24 Hz that include vertical frequencies are present. It is difficult for a user to understand which one of these 4K2K resolutions is set as the output resolution. For example, even when a display device is compatible with 3840×2160, three combinations of 4K2K including 3840×2160 30 Hz, 3840×2160 25 Hz, and 3840×2160 24 Hz are present, and thus the user cannot understand which one is optimum.

SUMMARY OF THE INVENTION

It is an object of the present invention to provide a video processing apparatus for setting an optimum combination of an output resolution and an output vertical frequency according to input video data and combinations of resolutions and vertical frequencies compatible with a video receiving apparatus.

A video processing apparatus, comprises: a video detecting section for detecting combinations of resolutions and vertical frequencies of input video data; a reading section for reading information about combinations of resolutions and vertical frequencies stored, in advance, in a video receiving apparatus connected to an outside from the video receiving apparatus; a setting section for setting a combination of an output resolution and an output vertical frequency, the value obtained by dividing a vertical frequency of the video data detected by the video detecting section by the output vertical frequency being an integer number, the combination of an output resolution and an output vertical frequency being present in the combinations of the resolutions and the vertical frequencies read by the reading section; and a video converting section for converting the combination of the output resolution and the output vertical frequency of the video data into the combination of the output resolution and output vertical frequency set by the setting section, and outputting the converted video data to the video receiving apparatus.

Video data is converted into an output vertical frequency such that a value obtained by dividing a vertical frequency of video data detected by a video detecting section by an output vertical frequency is an integer number. As a result, the converted video data can be smooth video data. Therefore, an optimum combination of the output resolution and the output vertical frequency can be automatically set.

Preferably when the combination of the output resolution and the output vertical frequency, in which the value obtained by dividing the vertical frequency of the video data detected by the video detecting section by the output vertical frequency is an integer number, is not present in the combinations of the resolutions and the vertical frequencies read by the reading section, the setting section sets a predetermined combination of an output resolution and an output vertical frequency.

Preferably when a plurality of combinations of the output resolutions and the output vertical frequencies, in which the values obtained by dividing the vertical frequencies of the video data detected by the video detecting section by the output vertical frequencies are integer numbers, is present in the combinations of the resolutions and the vertical frequencies read by the reading section, the setting section sets the combination of the output resolution and the output vertical frequency whose output resolution is the highest.

In this case, the video data can be converted into the highest output resolution. Therefore, the optimum combination of the output resolution and the output vertical frequency can be automatically set.

DETAILED DESCRIPTION OF THE PREFERRED EMBODIMENTS

A BD (Blu-Ray Disc) player, an AV amplifier (corresponding to a video processing apparatus of the present invention) and a display device (corresponding to a video receiving apparatus of the present invention) according to a preferred embodiment of the present invention will be concretely described below with reference to the drawings, but the present invention is not limited to the embodiment.

Figure 1:
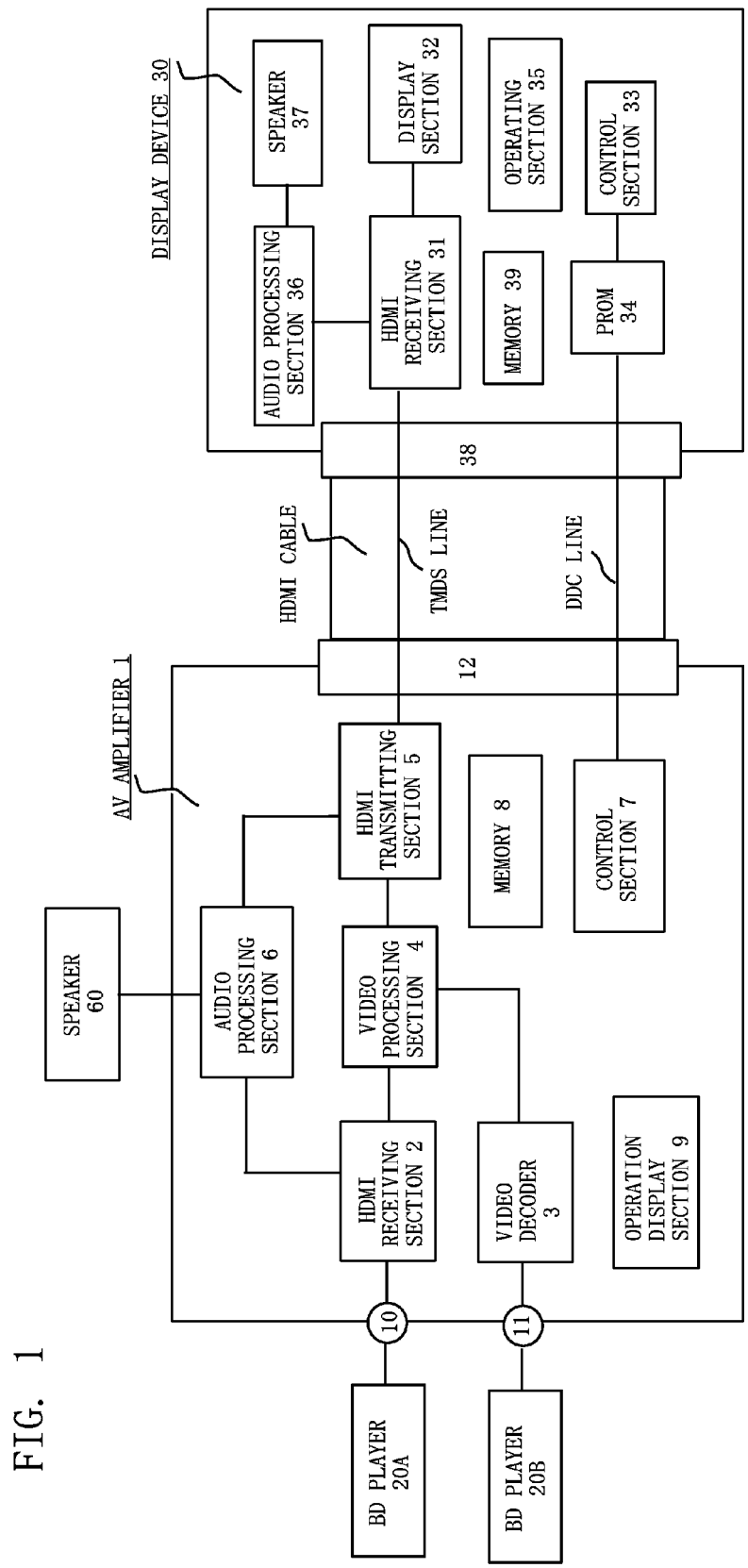
FIG. 1 is a block diagram illustrating an AV amplifier and a display device 30 according to a preferred embodiment of the present invention.

FIG. 1 is a block diagram illustrating an AV amplifier 1 and a display device 30. The AV amplifier 1 is connected with a BD player 20A via an HDMI cable, and is connected with a BD player 20B via an analog video cable. The AV amplifier 1 is connected with the display device 30 via the HDMI cable.

The AV amplifier 1 is provided with an HDMI receiving section 2, a video decoder 3, a video processing section 4, an HDMI transmitting section 5, an audio processing section 6, a control section 7, a memory (ROM or RAM) 8, an operation display section 9, an HDMI input terminal 10, an analog video input terminal 11, and an HDMI output terminal 12.

The HDMI receiving section 2 receives HDMI data from the BD player 20A via the HDMI input terminal 10. The HDMI receiving section 2 generates original video data (video data before HDMI conversion) based on the HDMI data, and supplies it to the video processing section 4. The HDMI receiving section 2 generates original audio data based on the HDMI data, and supplies it to the audio processing section 6.

The video decoder 3 receives an analog video signal from the BD player 20B via the input terminal 11, and converts it into digital video data so as to supply the digital video data to the video processing section 4.

The video processing section 4 selects one video data to be subject to a video process from the video data supplied from the HDMI receiving section 2 and the video data supplied from the video decoder 3 according to an instruction of the control section 7. The video processing section 4 executes the video process (in this example, a resolution and vertical frequency converting process) on the selected video data, and supplies the processed data to the HDMI transmitting section 5. That is to say, the video processing section 4 converts the video data into a combination of an output resolution and an output vertical frequency set by the control section 7 and outputs it.

The HDMI transmitting section 5 converts the video data supplied from the video processing section 4 and the audio data supplied from the audio processing section 6, if necessary, into HDMI data, and transmits the converted data to the display device 30 via an output terminal 12. The HDMI transmitting section 5 is connected to an HDMI receiving section 31 of the display device 30 via a TMDS line.

The audio processing section 6 executes a signal process, an amplifying process, and a D/A conversion on the audio data supplied from the HDMI receiving section 2, and supplies an audio signal to a speaker 60 connected to the outside. As the need arises, the audio processing section 6 supplies the audio data to the HDMI transmitting section 5.

The control section 7 executes a program stored in the memory 8, so as to control the respective sections of the AV amplifier 1, and it is, for example, a microcomputer or CPU. The control section 7 is connected to a PROM 34 of the display device 30 via a DDC line of HDMI, and reads EDID (Extended Display Identification Data) including information about the combinations of resolutions and vertical frequencies displayable on the display device 30 from the PROM 34.

The control section 7 causes the video processing section 4 to detect the information about the combination of the resolution and the vertical frequency of video data currently input, and obtains the information from the video processing section 4. The control section 7 sets the combination of the output resolution and the output vertical frequency at the time of outputting the video data to the display device 30 (the setting means storage in the memory 8) based on the combinations of resolutions and vertical frequencies of the currently input video data and the combinations of the resolutions and the vertical frequencies displayable on the display device 30.

More specifically, the control section 7 sets the combination of the output resolution and the output vertical frequency such that value obtained by dividing the vertical frequency of video data detected by the video processing section 4 by the output vertical frequency is the integer number and the combination is present in the combinations of the resolutions and the vertical frequencies read from the display device 30.

For example, when the AV amplifier 1 can convert the video data into 3840×2160 30 Hz, 3840×2160 25 Hz, 3840×2160 24 Hz, and 4096×2160 24 Hz that are 4K2K (these combinations of the resolutions and the vertical frequencies that can be converted are stored in the memory 8 in advance) and the vertical frequency of the video data is 60 Hz, 3840×2160 30 Hz is such that 60 Hz÷30 Hz=2, namely, becomes an integer number. Therefore, when 3840×2160 30 Hz is present in the combinations of the resolutions and the vertical frequencies read from the display device 30, 3840×2160 30 Hz is set as the output resolution and the output vertical frequency.

When the AV amplifier 1 can convert the video data into 3840×2160 30 Hz, 3840×2160 25 Hz, 3840×2160 24 Hz, and 4096×2160 24 Hz that are 4K2K and the vertical frequency of the video data is 50 Hz, 3840×2160 25 Hz is such that 50 Hz÷25 Hz=2, namely, becomes an integer number. Therefore, when 3840×2160 25 Hz is present in the combinations of the resolutions and the vertical frequencies read from the display device 30, 3840×2160 25 Hz is set as the output resolution and the output vertical frequency.

Preferably, in case that there is not the combination of the output resolution and the output vertical frequency such that value obtained by dividing the vertical frequency of video data by the output vertical frequency is the integer number in the combinations of the output resolutions and the output vertical frequencies read from the display device 30, the control section 7 sets 3840×2160 24 Hz that is a predetermined combination of a resolution and a vertical frequency in 4K2K.

For example, when the AV amplifier 1 can convert the video data into 3840×2160 30 Hz, 3840×2160 25 Hz, 3840×2160 24 Hz and 4096×2160 24 Hz that are 4K2K and the vertical frequency of the video data is 60 Hz, 3840×2160 30 Hz is such that 60 Hz÷30 Hz=2, namely, becomes an integer number. However, when 3840×2160 30 Hz is not present in the combinations of the resolutions and the vertical frequencies read from the display device 30, 3840×2160 24 Hz is set as the output resolution and the output vertical frequency.

For example, when the AV amplifier 1 can convert the video data into 3840×2160 30 Hz, 3840×2160 25 Hz, 3840×2160 24 Hz and 4096×2160 24 Hz that are 4K2K and the vertical frequency of the video data is 50 Hz, 3840×2160 25 Hz is such that 50 Hz÷25 Hz=2, namely, becomes an integer number. However, when 3840×2160 25 Hz is not present in the combinations of the resolutions and the vertical frequencies read from the display device 30, 3840×2160 24 Hz is set as the output resolution and the output vertical frequency.

Preferably, in case that there is a plurality of combinations of the output resolutions and the output vertical frequencies such that value obtained by dividing the vertical frequency of video data by the output vertical frequency is the integer number in the combinations of the output resolutions and the output vertical frequencies read from the display device 30, the control section 7 sets the combination of the highest output resolution and the output vertical frequency.

For example, when the AV amplifier 1 can convert the video data into 3840×2160 30 Hz, 3840×2160 25 Hz, 3840×2160 24 Hz, and 4096×2160 24 Hz that are 4K2K and the vertical frequency of the video data is 24 Hz, 3840×2160 24 Hz and 4096×2160 24 Hz are such that 24 Hz÷24 Hz=1, namely, become integer numbers. When both of them are present in the combinations of the resolutions and the vertical frequencies read from the display device 30, 4096×2160 24 Hz whose output resolution is the highest is optimum and is, thus, set as the output resolution and the output vertical frequency.

The display device 30 has the HDMI receiving section 31, a display section 32, a control section 33, an EDID PROM (hereinafter, PROM) 34, an operating section 35, an audio processing section 36, a speaker 37, an HDMI input terminal 38, and a memory (ROM, or RAM) 39.

The HDMI receiving section 31 receives HDMI data from the HDMI transmitting section 5 via the HDMI input terminal 38, and generates original video data based on the HDMI data so as to supply it to the display section 32. The HDMI receiving section 31 generates original audio data based on the HDMI data, and supplies it to the audio processing section 36.

The display section 32 is, for example, LCD or PDP to which video data is supplied from the HDMI receiving section 31, and displays a video based on the video data.

The audio processing section 36 executes a signal process, an amplifying process, and D/A conversion on the audio data supplied from the HDMI receiving section 31, and supplies the processed data to the speaker 37.

The control section 33 is, for example, a microcomputer or a CPU that executes a program stored in the memory 39, so as to control the respective sections of the display device 30.

EDID including information about the combinations of the resolutions and the vertical frequencies displayable on the display section 32 is stored in the PROM 34 in advance. The EDID is read by the control section 7 of the AV amplifier 1 via the DDC line.

Figure 2:
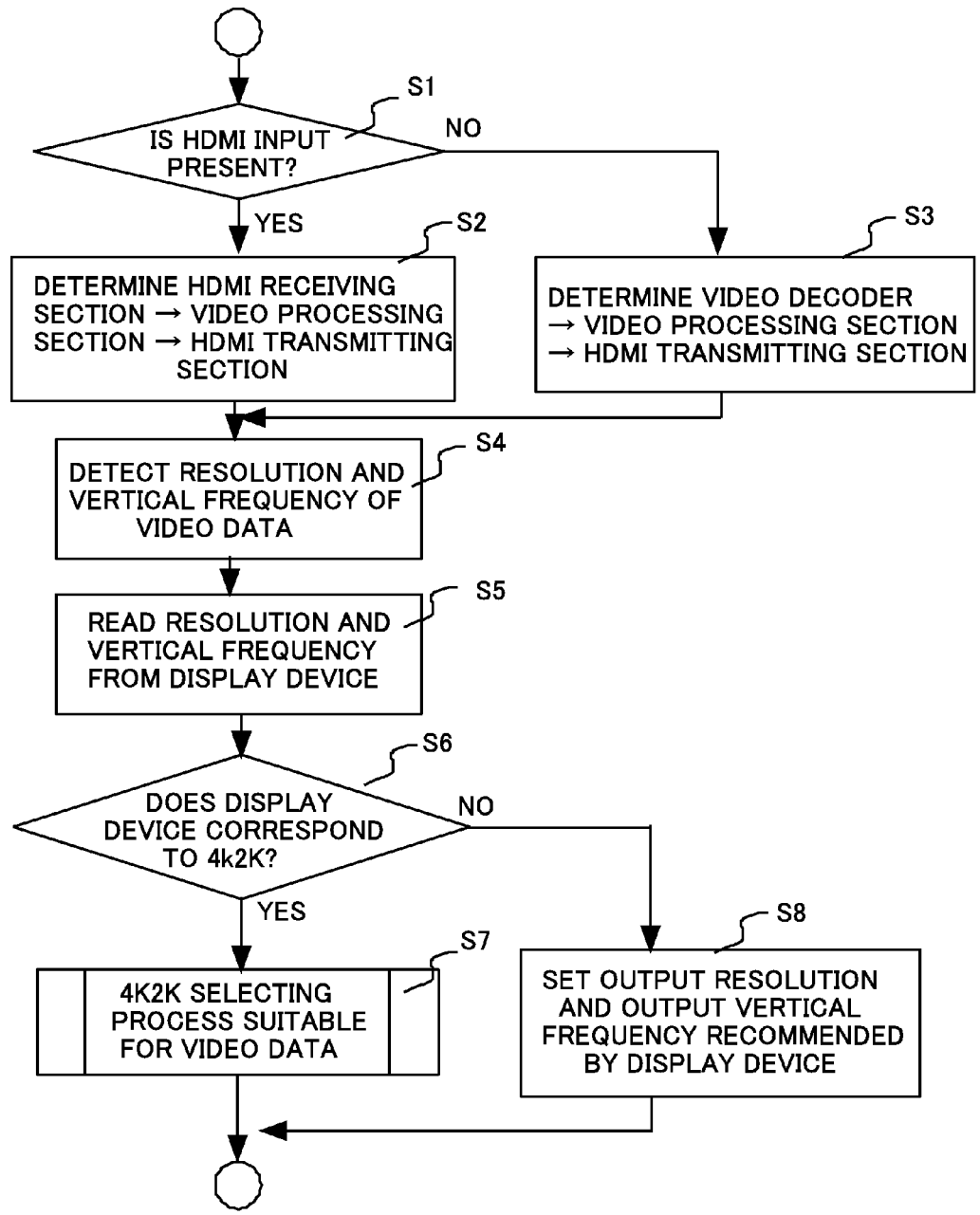
FIG. 2 is a flowchart illustrating a process of a control section 7.

A process for determining the combination of the output resolution and the output vertical frequency by means of the control section 7 of the AV amplifier 1 will be described below. As shown in FIG. 2, the control section 7 determines whether the HDMI data is input (S1). This can be determined based on notification from the HDMI receiving section 2. When the HDMI data is input (YES in S1), the control section 7 changes over a route of the video data to the HDMI receiving section 2-the video processing section 4-the HDMI transmitting section 5 (S2). When the HDMI data is not input (NO in S1), the control section 7 changes over the route of the video data to the video decoder 3-the video processing section 4-the HDMI transmitting section 5 (S3).

The control section 7 causes the video processing section 4 to detect information about the combinations of resolutions and vertical frequencies of video data input currently into the video processing section 4, and obtains the information from the video processing section 4 so as to save it in the memory 8 (S4). The control section 7 obtains EDID from the PROM 34 of the display device 30 via the DDC line, and reads information about the combinations of resolutions and vertical frequencies that is included in EDID and displayable on the display device 30 so as to save the information in the memory 8 (S5).

The control section 7 determines whether any one of 4K2K (3840×2160 30 Hz, 3840×2160 25 Hz, 3840×2160 24 Hz, and 4096×2160 24 Hz) that can be converted by the AV amplifier 1 (namely, stored in the memory 8 in advance) is included in the combinations of resolutions and vertical frequencies read from the EDID (S6).

When it is included (YES in S6), the control section 7 executes the process for determining the combination of the output resolution and the output vertical frequency based on the combinations of resolutions and vertical frequencies of video data currently input into the video processing section 4 and the combinations of resolutions and vertical frequencies read from the EDID (S7).

When no 4K2K is included (NO in S6), the control section 7 determines a combination of a resolution and a vertical frequency recommended by the display device 30 from the combinations of the resolutions and the vertical frequencies read from EDID as the combination of the output resolution and the output vertical frequency (S8).

Figure 3:
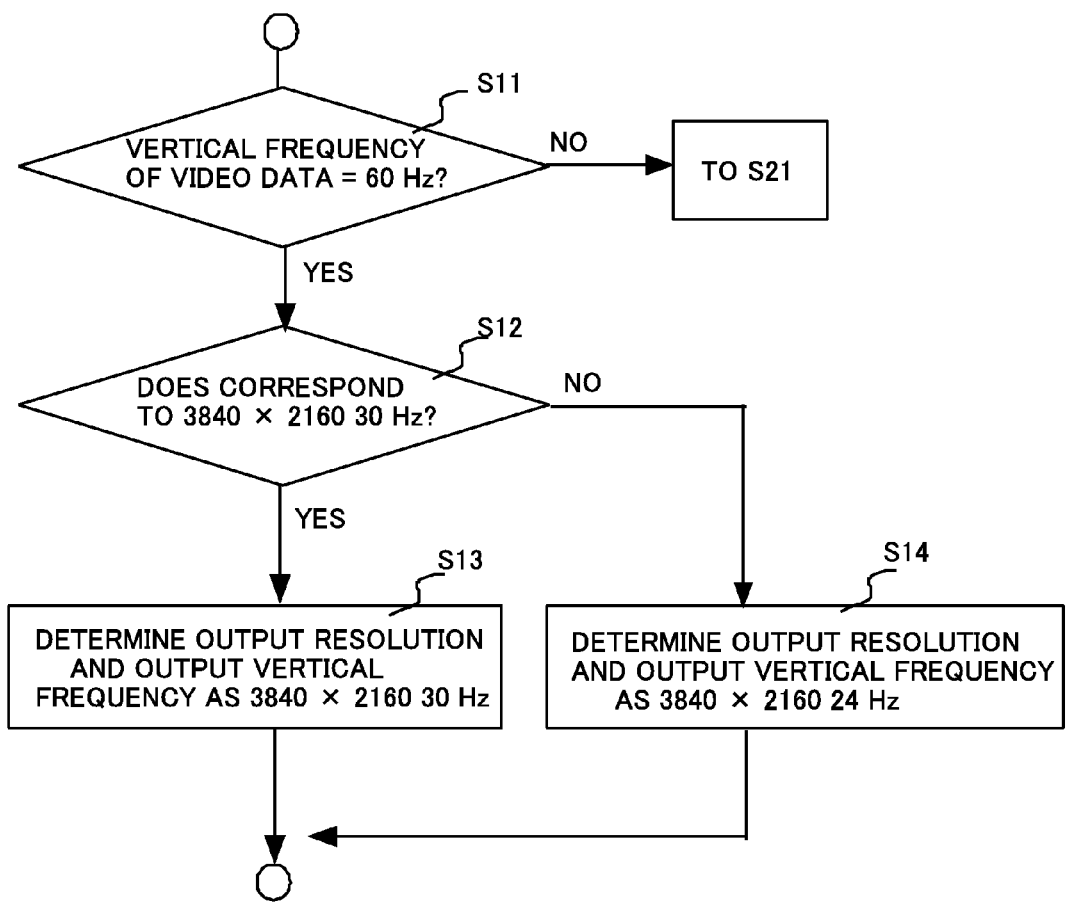
FIG. 3 is a flowchart illustrating the process of the control section 7.
Figure 4:
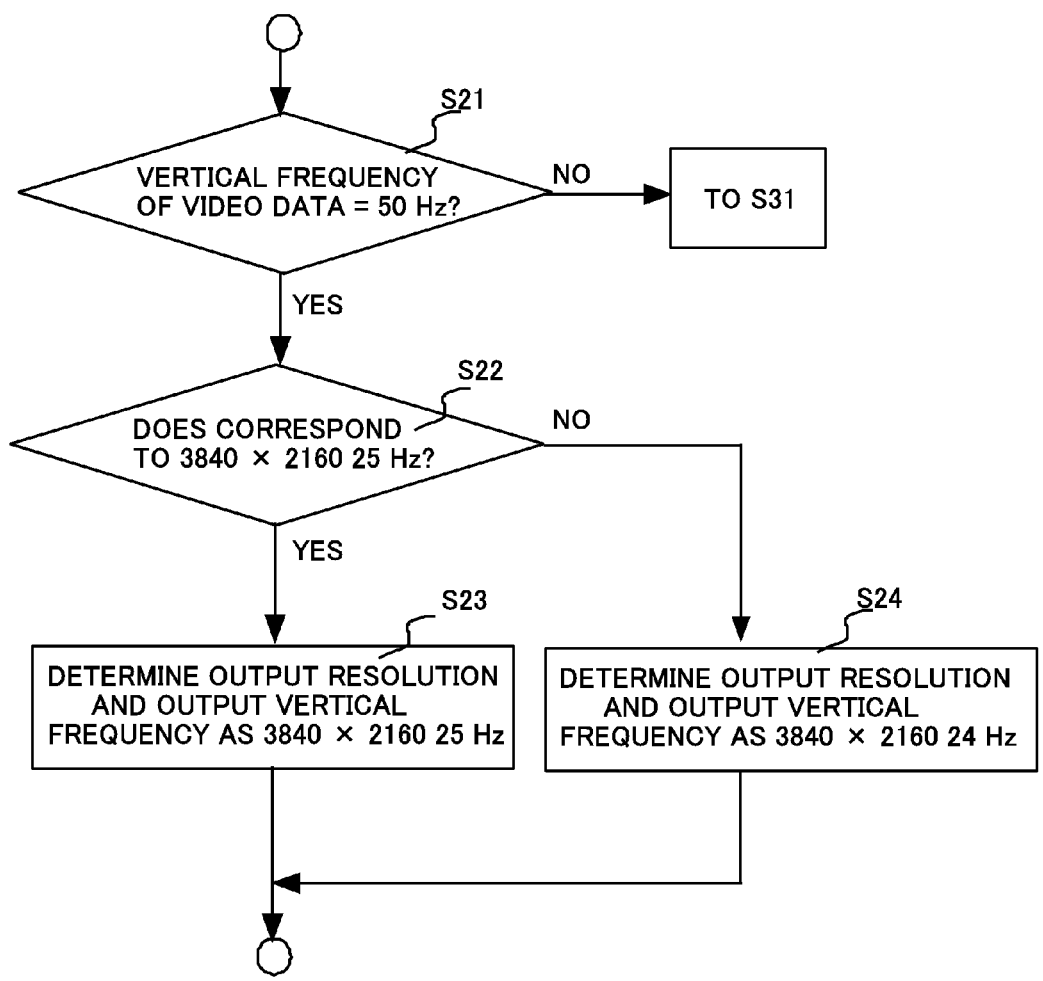
FIG. 4 is a flowchart illustrating the process of the control section 7.
Figure 5:
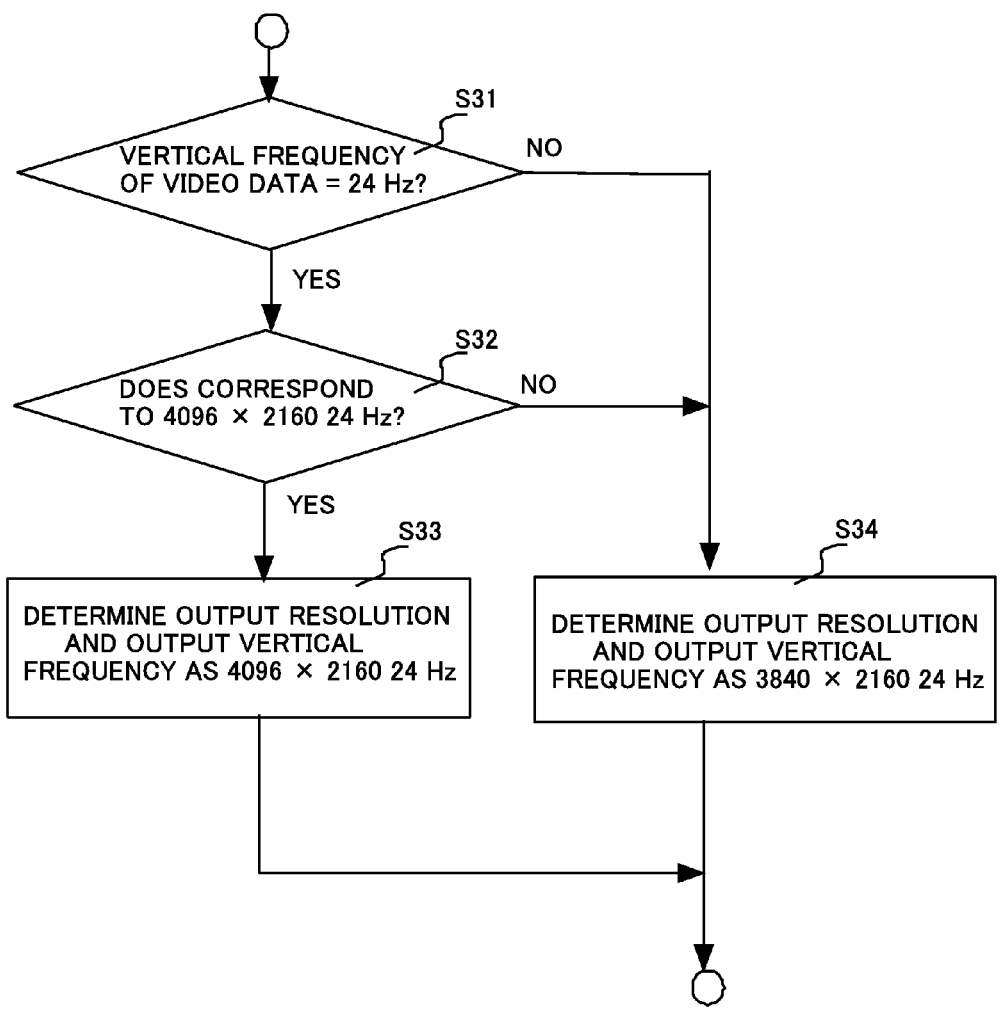
FIG. 5 is a flowchart illustrating the process of the control section 7.
Figure 6:
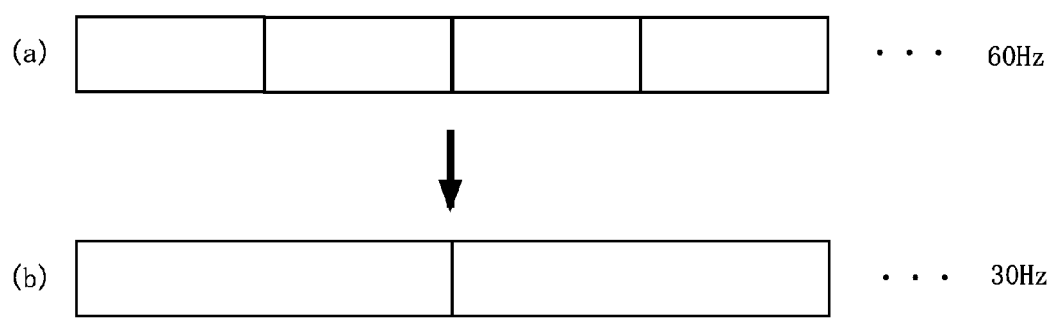
FIG. 6 is a pattern diagram illustrating conversion of a vertical frequency.

Details of S7 will be described with reference to FIGS. 3 to 5. The control section 7 determines whether the vertical frequency of the video data input currently into the video processing section 4 is 60 Hz (S11). When the vertical frequency is 60 Hz (YES in S11), the control section 7 determines that a value that becomes an integer number of 2, obtained when 60 Hz in vertical frequencies of 4K2K is divided, namely, 30 Hz is optimum as the output vertical frequency. As shown in FIG. 6, when the vertical frequency is converted from (a) 60 Hz into (b) 30 Hz, two frames are combined so that one frame may be generated. For this reason, a process for generating a frame can be simplified, and smooth video data can be generated. 4K2K where the vertical frequency is 30 Hz is 3840×2160 30 Hz.

Therefore, the control section 7 determines whether the display device 30 can display the video data of 3840×2160 30 Hz (S12). That is to say, the determination is made whether 3840×2160 30 Hz is present in the combinations of resolutions and vertical frequencies read from the EDID. When 3840×2160 30 Hz is present (YES in S12), the control section 7 sets 3840×2160 30 Hz as the combination of output resolution and output vertical frequency (S13).

When 3840×2160 30 Hz is not present (NO in S12), the control section 7 sets another 4K2K as the combination of the output resolution and the output vertical frequency (S14). More specifically, default (predetermined) 3840×2160 24 Hz in 4K2K is set as the combination of the output resolution and the output vertical frequency. This is because it is considered that when the display device 30 is compatible with 4K2K, the display device 30 is necessarily compatible with 3840×2160 24 Hz.

When the resolution is not 60 Hz in S11 (NO in S11), the sequence goes to S21. As shown in FIG. 4, the control section 7 determines whether the vertical frequency of the video data input currently into the video processing section 4 is 50 Hz (S21). When the vertical frequency is 50 Hz (YES in S21), the control section 7 determines that a value that becomes an integer number 2 when 50 Hz in the vertical frequencies of 4K2K is divided, namely, 25 Hz is optimum as the output vertical frequency. When the vertical frequency is converted from 50 Hz into 25 Hz, two frames are combined so that one frame may be generated. For this reason, the frame generating process is simplified, and smooth video data can be generated. 4K2K where the vertical frequency is 25 Hz is 3840×2160 25 Hz.

Therefore, the control section 7 determines whether the display device 30 can display the video data of 3840×2160 25 Hz (S22). That is to say, the determination is made whether 3840×2160 25 Hz is present in the combinations of the resolutions and the vertical frequencies read from the EDID. When 3840×2160 25 Hz is present (YES in S22), the control section 7 sets the combination of the output resolution and the output vertical frequency as 3840×2160 25 Hz (S23).

When 3840×2160 25 Hz is not present (NO in S22), the control section 7 sets another 4K2K as the combination of the output resolution and the output vertical frequency (S24). More specifically, default 3840×2160 24 Hz in 4K2K is set as the combination of the output resolution and the output vertical frequency.

When the vertical frequency is not 50 Hz in S21 (NO in S21), the sequence goes to S31. As shown in FIG. 5, the control section 7 determines whether the vertical frequency of the video data input currently into the video processing section 4 is 24 Hz (S31). When the vertical frequency is 24 Hz (YES in S31), the control section 7 determines that a value that becomes an integer number of 1 when 24 Hz is divided, namely, 24 Hz is optimum as the output vertical frequency.

Since the vertical frequency is not converted, smooth video data can be generated. In 4K2K that can be converted by the AV amplifier 1, the vertical frequency that is 24 Hz is 3840×2160 24 Hz and 4096×2160 24 Hz. Since two 4K2K are present, preferentially the determination is made whether 4096×2160 24 Hz whose resolution is higher can be displayed on the display device 30.

The control section 7 determines whether the display device 30 can display the video data of 4096×2160 24 Hz (S32). That is to say, the determination is made whether 4096×2160 24 Hz is present in the combinations of resolutions and vertical frequencies read from the EDID. When 4096×2160 24 Hz is present (YES in S32), the control section 7 sets 4096×2160 24 Hz as the combination of the output resolution and the output vertical frequency (S33).

When 4096×2160 24 Hz is not present (NO in S32), the control section 7 sets default 3840×2160 24 Hz as the combination of the output resolution and the output vertical frequency (S34). When the vertical frequency is not 24 Hz in S31 (NO in S31), the control section 7 sets default 3840×2160 24 Hz as the combination of the output resolution and the output vertical frequency (S34).

In the embodiment, the optimum combination of the output resolution and the output vertical frequency can be set according to video data to be input and the combinations of resolutions and vertical frequencies compatible with the video receiving apparatus.

The video processing apparatus according to the present invention can be applied to another devices other than the AV amplifier 1. For example, when a source device such as the BD player is connected to the display device, the present invention can be applied also to the BD player.

The preferred embodiment of the present invention is described above, but the present invention is not limited to the embodiment. Further, the present invention may be provided as a form of a computer program for causing a computer to perform operations of a BD player, an AV amplifier and a display device, and a form of a recording medium that records such a program therein.

What is claimed is:

1. A video processing apparatus, comprising:
    a video detecting section for detecting combinations of resolutions and vertical frequencies of input video data;
    a reading section for reading information about combinations of resolutions and vertical frequencies stored, in advance, in a video receiving apparatus connected to an outside from the video receiving apparatus;
    a setting section for setting a combination of an output resolution and an output vertical frequency, the value obtained by dividing a vertical frequency of the video data detected by the video detecting section by the output vertical frequency being an integer number, the combination of an output resolution and an output vertical frequency being present in the combinations of the resolutions and the vertical frequencies read by the reading section; and
    a video converting section for converting the combination of the output resolution and the output vertical frequency of the video data into the combination of the output resolution and the output vertical frequency set by the setting section, and outputting the converted video data to the video receiving apparatus,
    wherein when the combination of the output resolution and the output vertical frequency, in which the value obtained by dividing the vertical frequency of the video data detected by the video detecting section by the output vertical frequency is an integer number, is not present in the combinations of the resolutions and the vertical frequencies read by the reading section, the setting section sets a predetermined combination of an output resolution and an output vertical frequency, and
    when a plurality of combinations of the output resolutions and the output vertical frequencies, in which the values obtained by dividing the vertical frequencies of the video data detected by the video detecting section by the output vertical frequencies are integer numbers, is present in the combinations of the resolutions and the vertical frequencies read by the reading section, the setting section sets the combination of the output resolution and the output vertical frequency whose output resolution is the highest.

2. A computer program containing instructions stored on a non-transitory computer-readable medium causing a computer in a video processing apparatus to execute:
    a video detecting step of detecting combinations of resolutions and vertical frequencies of input video data;
    a reading step of reading information about combinations of resolutions and vertical frequencies stored, outside in advance, in a video receiving apparatus connected to an outside from the video receiving apparatus;
    a setting step of setting a combination of an output resolution and an output vertical frequency, the value obtained by dividing a vertical frequency of the video data detected by the video detecting step by the output vertical frequency being an integer number, the combination of an output resolution and an output vertical frequency being present in the combinations of the resolutions and the vertical frequencies read by the reading step; and
    a video converting step of converting the combination of the output resolution and the output vertical frequency of the video data into the combination of the output resolution and output vertical frequency set by the setting step, and outputting the converted video data to the video receiving apparatus,
    wherein when the combination of the output resolution and the output vertical frequency, in which the value obtained by dividing the vertical frequency of the video data detected by the video detecting step by the output vertical frequency is an integer number, is not present in the combinations of the resolutions and the vertical frequencies read by the reading step, the setting step sets a predetermined combination of an output resolution and an output vertical frequency, and
    when a plurality of combinations of the output resolutions and the output vertical frequencies, in which the values obtained by dividing the vertical frequencies of the video data detected by the video detecting step by the output vertical frequencies are integer numbers, is present in the combinations of the resolutions and the vertical frequencies read by the reading step, the setting step sets the combination of the output resolution and the output vertical frequency whose output resolution is the highest.

3. A video processing method, comprising:
    a video detecting step of detecting combinations of resolutions and vertical frequencies of input video data;
    a reading step of reading information about combinations of resolutions and vertical frequencies stored, in advance, in a video receiving apparatus connected to an outside from the video receiving apparatus;
    a setting step of setting a combination of an output resolution and an output vertical frequency, the value obtained by dividing a vertical frequency of the video data detected by the video detecting step by the output vertical frequency being an integer number, the combination of an output resolution and an output vertical frequency being present in the combinations of the resolutions and the vertical frequencies read by the reading step; and a video converting step of converting the combination of the output resolution and the output vertical frequency of the video data into the combination of the output resolution and output vertical frequency set by the setting step, and outputting the converted video data to the video receiving apparatus, wherein when the combination of the output resolution and the output vertical frequency, in which the value obtained by dividing the vertical frequency of the video data detected by the video detecting step by the output vertical frequency is an integer number, is not present in the combinations of the resolutions and the vertical frequencies read by the reading step, the setting step sets a predetermined combination of an output resolution and an output vertical frequency, and when a plurality of combinations of the output resolutions and the output vertical frequencies, in which the values obtained by dividing the vertical frequencies of the video data detected by the video detecting step by the output vertical frequencies are integer numbers, is present in the combinations of the resolutions and the vertical frequencies read by the reading step, the setting step sets the combination of the output resolution and the output vertical frequency whose output resolution is the highest.

* * * * *